United States Patent
Rath

[11] Patent Number: 5,962,604
[45] Date of Patent: Oct. 5, 1999

[54] PROCESS FOR PREPARING LOW MOLECULAR WEIGHT, HIGHLY REACTIVE POLYISOBUTYLENE

[75] Inventor: Hans Peter Rath, Grünstadt, Germany

[73] Assignee: BASF Aktiengesellschaft, Ludwigshafen, Germany

[21] Appl. No.: 08/973,643

[22] PCT Filed: Jun. 4, 1996

[86] PCT No.: PCT/EP96/02414

§ 371 Date: Nov. 25, 1997

§ 102(e) Date: Nov. 25, 1997

[87] PCT Pub. No.: WO96/40808

PCT Pub. Date: Dec. 19, 1996

[30] Foreign Application Priority Data

Jun. 7, 1995 [DE] Germany .............................. 195 200 78

[51] Int. Cl.$^6$ .............................. C08F 110/10; C08F 4/14
[52] U.S. Cl. .............................. 526/65; 526/73; 526/237; 526/348.7; 585/510; 585/521; 585/525
[58] Field of Search .............................. 526/65, 73, 237, 526/348.7; 585/510, 521, 525

[56] References Cited

U.S. PATENT DOCUMENTS

| | | | |
|---|---|---|---|
| 4,152,499 | 5/1979 | Boerzel et al. | 526/237 X |
| 4,663,406 | 5/1987 | Bronstert et al. | 526/237 X |
| 5,408,018 | 4/1995 | Rath | 526/237 |

FOREIGN PATENT DOCUMENTS

| | | |
|---|---|---|
| 145 235 | 6/1985 | European Pat. Off. . |
| 322 241 | 6/1989 | European Pat. Off. . |
| 481 297 | 4/1992 | European Pat. Off. . |
| 628 575 | 12/1994 | European Pat. Off. . |
| 27 02 604 | 7/1978 | Germany . |
| 93/10063 | 5/1993 | WIPO . |

OTHER PUBLICATIONS

Polyisobutylen und Isobutylen–Mischpolymerisate, Gueterbock, Springer–Verlag 1959.
J. Polymer Sci. Symposium No. 56, 191 (1976).

*Primary Examiner*—Fred Teskin
*Attorney, Agent, or Firm*—Keil & Weinkauf

[57] ABSTRACT

Low molecular weight, highly reactive polyisobutene having an average molecular weight $M_n$ of from 500 to 20000 Dalton and containing over 80 mol % of terminal double bonds is prepared by the polymerization of isobutene or an isobutene-containing hydrocarbon stream in the liquid phase and with the aid of a boron trifluoride complex catalyst at from −40 to 0° C. and at from 1 to 20 bar, by a process in which the polymerization reaction is carried out in at least two polymerization stages, the added isobutene being polymerized to a partial conversion of up to 95% in the first polymerization stage and the polymerization of the remaining isobutene being continued in one or more subsequent polymerization stages, without or after prior isolation of the polyisobutene formed in the first polymerization stage.

9 Claims, 1 Drawing Sheet

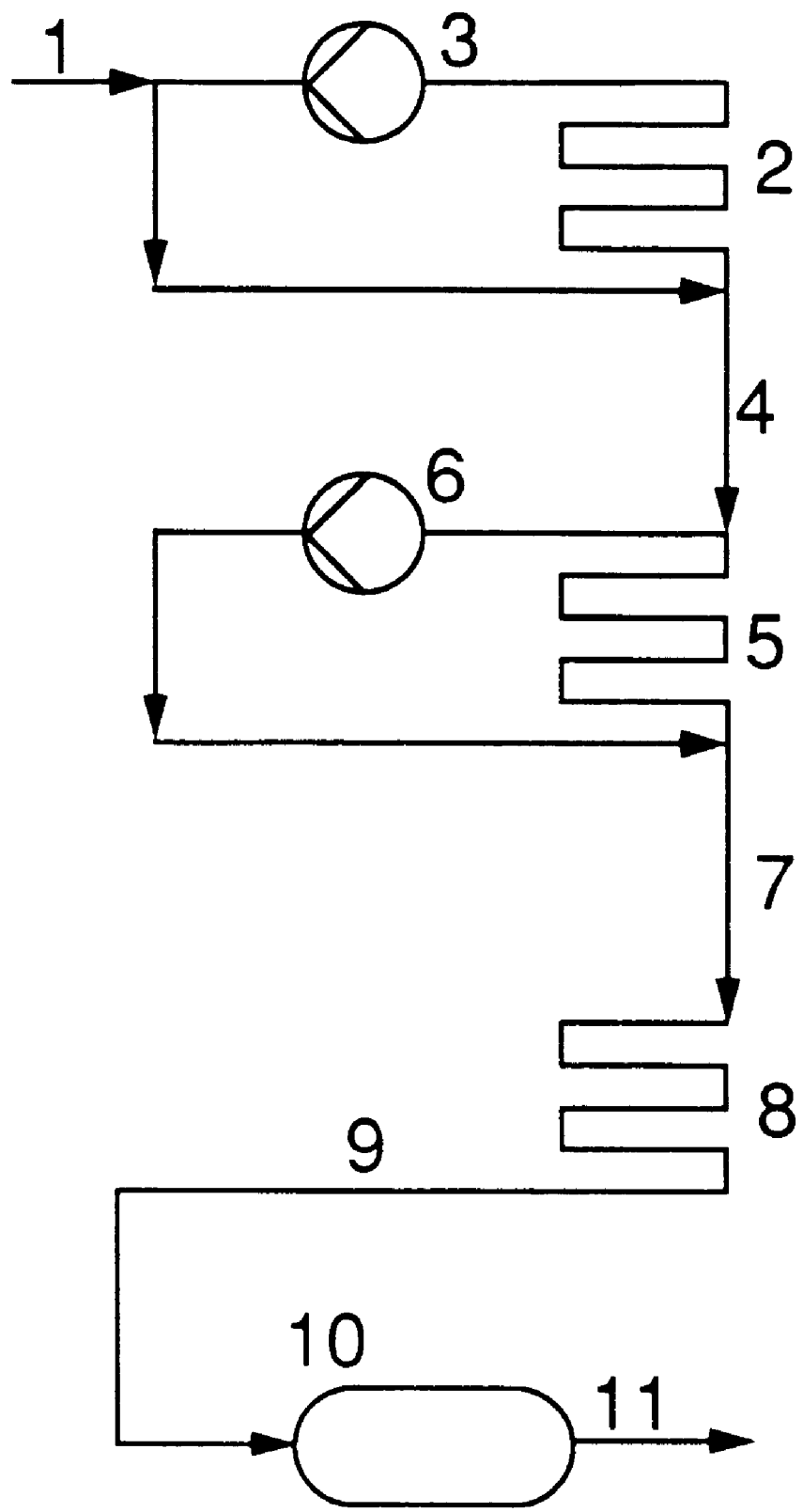

PROCESS FOR PREPARING LOW MOLECULAR WEIGHT, HIGHLY REACTIVE POLYISOBUTYLENE

The present invention relates to a process for the preparation of low molecular weight, highly reactive polyisobutene having an average molecular weight $M_n$ of from 500 to 20000 Dalton and containing over 80 mol % of terminal double bonds by the polymerization of isobutene or an isobutene-containing hydrocarbon stream in the liquid phase and with the aid of a boron trifluoride complex catalyst at from 0 to $-40°$ C. and from 1 to 20 bar.

Low molecular weight and high molecular weight polyisobutenes having molecular weights of up to several 100000 Dalton have long been known and their preparation is described, for example, in H. Güterbock: Polyisobutylen und Mischpolymerisate, pages 77 to 104, Springer, Berlin 1959. The currently available polyisobutenes of this molecular weight range are generally prepared with the aid of Lewis acid catalysts, such as aluminum chloride, alkylaluminum chlorides or boron trifluoride, and generally have less than 10 mol % of terminal double bonds (vinylidene groups) and a molecular weight distribution (dispersity) of from 2 to 7.

A distinction must be made between these conventional polyisobutenes and the highly reactive polyisobutenes, which as a rule have average molecular weights of from 500 to 5000 Dalton and preferably contain substantially more than 60 mol % of vinylidene groups. Such highly reactive polyisobutenes are used as intermediates for the preparation of additives for lubricants and fuels, as described, for example, in DE-A 27 02 604. For the preparation of these additives, polyisobutene/maleic anhydride adducts, in particular polyisobutenylsuccinic anhydrides, are first produced by reacting the terminal double bonds of the polyisobutene with maleic anhydride, and said adducts are then reacted with certain amines to give the finished additive. Since in adduct formation with maleic anhydride it is mainly the vinylidene double bonds which react, whereas, depending on their position in the macromolecule, the double bonds present further in the interior of the macromolecules lead to substantially lower, if any, conversion without the addition of halogens, the amount of terminal double bonds in the molecule is the most important quality criterion for this type of polyisobutene.

The formation of the vinylidene double bonds and the isomerization of the terminal double bonds in the isobutene macromolecules to internal double bonds are, according to Puskas et al., J. Polymer Sci.: Symposium No. 56 (1976), 191, based on the concepts shown in the scheme below:

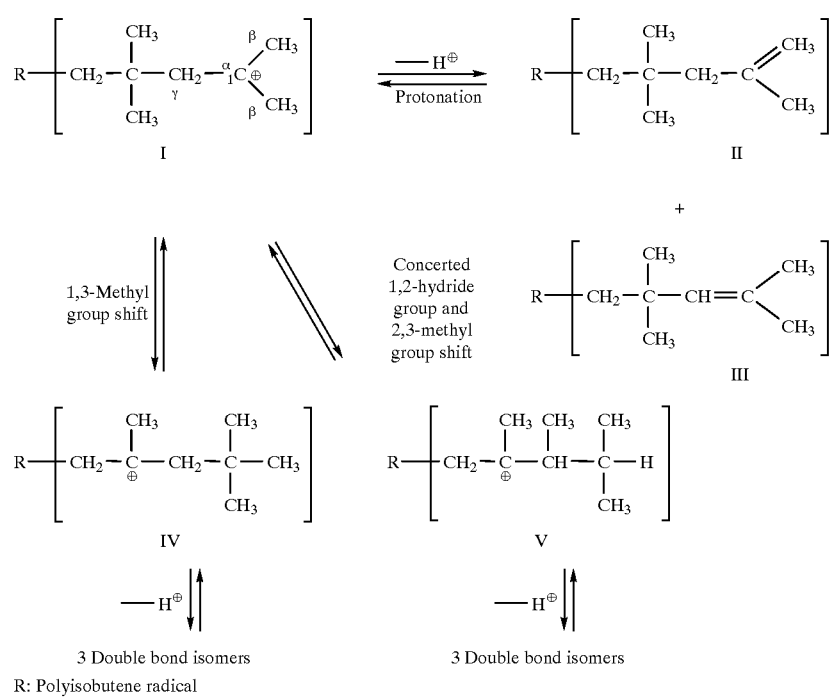

R: Polyisobutene radical

The polyisobutene cation I formed in the course of the polymerization reaction may be converted into the relevant polyisobutene as a result of the elimination of a proton. The proton may be eliminated from one of the β-methyl groups or from the internal γ-methylene group. Depending on which of these two positions the proton is eliminated from, a polyisobutene having a vinylidene double bond II or having a trisubstituted double bond III present close to the end of the molecule is formed.

The polyisobutene cation I is relatively unstable and attempts to achieve stability by rearrangement to form more highly substituted cations. Both 1,3-methyl group shifts to give the polyisobutene cation IV and successive or concerted 1,2-hydride group and 2,3-methyl group shifts to give the polyisobutene cation V may take place. Depending on the position from which the proton is eliminated, in each case three different polyisobutene double bond isomers can form from the cations IV and V. However, it is also possible for the cations IV and V to undergo further rearrangement, causing the double bond to migrate further into the interior of the polyisobutene macromolecule.

All these deprotonations and rearrangements are equilibrium reactions and therefore reversible, but in the end the formation of more stable, more highly substituted cations and hence the formation of polyisobutenes having an internal double bond with establishment of the thermodynamic equilibrium are preferred. These deprotonations, protonations and rearrangements are catalyzed by any traces of acid present in the reaction mixture, but in particular by the actual Lewis acid catalyst required for catalyzing the polymerization. Because of these facts and since only polyisobutenes having vinylidene double bonds according to the formula II react very well with maleic anhydride with adduct formation, but polyisobutenes of the formula III have in comparison substantially lower reactivity and other polyisobutenes having more highly substituted double bonds are virtually unreactive toward maleic anhydride, the continued efforts of many research groups to find improved processes for the preparation of highly reactive polyisobutenes having higher and higher contents of terminal double bonds is understandable.

The preparation of low molecular weight, highly reactive polyisobutene from isobutene or isobutene-containing hydrocarbon streams, in particular from $C_4$ cuts, substantially freed from 1,3-butadiene originally present therein, from steam crackers, FCC crackers (FCC: Fluid Catalyzed Cracking), ie. refined $C_4$ products, is known from a number of patents, for example from EP-A 145 235, EP-A 481 297, DE-A 27 02 604, EP-A 628 575, EP-A 322 241 and WO 93/10063. All these processes relate to the polymerization of isobutene in a single polymerization stage.

One disadvantage of these processes is that fluorine-containing byproducts are formed owing to the use of a $BF_3$ complex catalyst. The fluorine contents of the polyisobutenes prepared by these processes may be up to 200 ppm. When these fluorine-containing polyisobutenes are subjected to thermal stress, the result is the elimination of hydrogen fluoride, which is highly corrosive. This problem is particularly serious when isobutene-containing $C_4$ cuts are used as starting material, since, owing to the content of n-butenes, this results in the formation of relatively stable secondary fluorides of polyisobutene which, in the further derivatization of the polyisobutene to give fuel additives and lubricating oil additives or during the subsequent use of these fuel additives in the engine, may then be eliminated with formation of hydrogen fluoride and thus cause corrosion damage.

A further disadvantage of the single-stage polymerization procedure in the use of $C_4$ cuts is associated with the n-butenes contained in these hydrocarbon streams. As a result of their incorporation in the growing polymer chain, the polymerization may be terminated and the selectivity with respect to the formation of highly reactive polyisobutene, ie. polyisobutene having a high content of vinylidene double bonds, decreases.

In order to avoid this disadvantage, according to the processes known so far, the polymerization must be terminated at a still relatively high residual isobutene content of the $C_4$ cut used in the polymerization. However, this leads to a large loss of starting material, making the preparation of PIB from $C_4$ cuts by these conventional processes uneconomical.

It is an object of the present invention to provide a process for the preparation of low molecular weight, highly reactive polyisobutene (PIB) whose fluorine content is substantially less than the fluorine content of the polyisobutene prepared by the known processes. The process should in particular also permit the preparation of PIB having a low fluorine content and a high content of terminal double bonds from $C_4$-hydrocarbon streams and should be economical.

Furthermore, the PIB thus prepared should have a narrow molecular weight distribution D.

We have found that this object is achieved by a process for the preparation of low molecular weight, highly reactive polyisobutene having an average molecular weight $M_n$ of from 500 to 20000 Dalton and containing over 80 mol % of terminal double bonds by the polymerization of isobutene or an isobutene-containing hydrocarbon stream in the liquid phase and with the aid of a boron trifluoride complex catalyst at from –40 to 0° C. and at from 1 to 20 bar, which comprises carrying out the polymerization reaction in at least two polymerization stages, the added isobutene being polymerized to a partial conversion of up to 95% in the first polymerization stage and the polymerization of the remaining isobutene being continued in one or more subsequent polymerization stages, without or after prior isolation of the polyisobutene formed in the first polymerization stage.

The novel process is based on the knowledge gained by the inventors in connection with investigations into the formation of fluorine-containing organic byproducts in the preparation of PIB by means of $BF_3$ complex catalysts and which was interpreted according to the following scheme and used as a working hypothesis for the present invention. In this scheme, the $BF_3$-alcohol complex used is representative of other $BF_3$ complex catalysts.

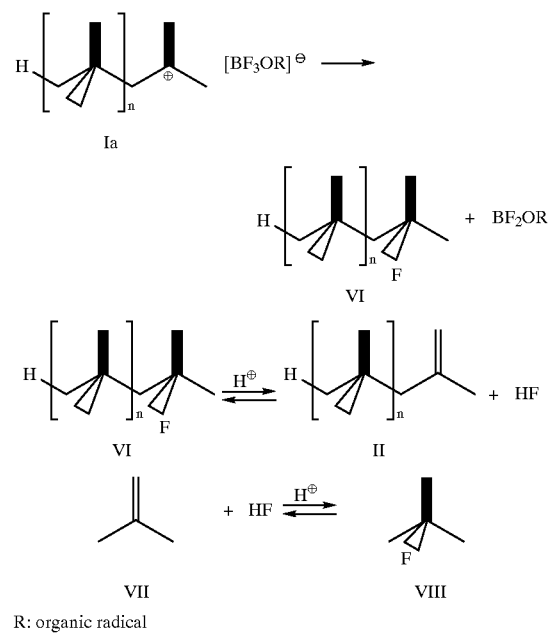

R: organic radical

The starting point in this scheme is the polyisobutyl cation Ia which forms in the course of the isobutene polymerization and whose opposite ion is the $[BF_3OR]^-$ anion. A fluoride anion can be transferred from this anion to the polyisobutyl cation Ia with formation of the polyisobutyl fluoride VI and $BF_2OR$. In the presence of protons in the polymerization mixture, said polyisobutyl fluoride is in equilibrium with the polyisobutene II and hydrogen fluoride. The hydrogen fluoride formed may undergo an addition reaction with the monomer isobutene VII which is also present in the polymerization mixture and which, in the presence of protons, is in equilibrium with the tert-butyl fluoride VIII formed here. By means of extraction or neutralization of the $BF_3$ complex catalyst or of the polymerization mixture, it is possible to prevent these equilibria from being established.

When isobutene-containing $C_4$ cuts which also contain linear butenes are used, the reaction sequence shown in the scheme is even further complicated by virtue of the fact that the incorporation of 1-butene into the growing polyisobutene chain results in the formation of secondary carbenium ions in the polymer, which, in the case of fluoride transfer from the anion, can react to form secondary polyisobutyl fluorides, from which the fluorine can be eliminated only with difficulty under the polymerization conditions.

The establishment of the equilibria shown in the scheme as well as the shifting thereof is dependent on the reaction conditions used, in particular on the ratios of polymer and monomers present in the polymerization mixture, on the type of $BF_3$ complex catalyst and on the $BF_3$/complexing agent ratio, and furthermore on the polymerization temperature established.

In view of these results, it is an object of the present invention to design the reaction procedure for the isobutene polymerization in such a way that the formation of fluorine-containing organic byproducts, in particular of polyisobutyl fluorides, is reduced to a minimum without the formation of low molecular weight polyisobutene having a high content of vinylidene double bonds being adversely affected.

We have found that this object is achieved by the measure for carrying out the isobutene polymerization in at least two polymerization stages, the second polymerization stage or further subsequent polymerization stages being operated at a temperature which as a rule is lower than that in the first polymerization stage.

The novel process and some advantageous embodiments of this process are illustrated below.

In its simplest embodiment, the novel process is operated in two polymerization stages. Various methods can be adopted in order to obtain high contents of terminal double bonds and a low fluorine content of the polyisobutene.

For example, it is possible to establish an isobutene conversion of from 5 to 98%, preferably from 50 to 95%, in particular from 50 to 90%, in the first polymerization stage and to complete the polymerization in the second stage.

The second polymerization stage is advantageously operated at a lower polymerization temperature than the first polymerization stage, as a rule the temperature difference being from 1 to 20° C., preferably from 2 to 10° C.

Since the polymerization of the isobutene is exothermic, the polymerization temperature in the first polymerization stage is controlled, at a predetermined coolant temperature and as a function of the reactivity of the catalyst used, by the addition of fresh isobutene at a rate such that said polymerization temperature remains essentially constant, apart from technically unavoidable fluctuations. The isobutene conversion in the first polymerization stage is controlled by establishing the reactivity of the catalyst complex via metering of the complexing agent, taking into account the abovementioned parameters, ie. coolant temperature, polymerization temperature and an average residence time of the reaction mixture in the reactor.

The discharge from the first polymerization stage is preferably passed without further working up into the second polymerization stage. Here, the polymerization is carried out, without the addition of fresh isobutene, at a lower polymerization temperature than that in the first polymerization stage. This can be affected by means of a lower coolant temperature or the use of a coolant at the same temperature as in the first polymerization stage, for example with the use of the cooling apparatus used there, by controlling the cooling in such a way that the quantity of heat removed from the polymerization mixture is greater than the quantity of heat released there in the polymerization of the remaining isobutene. Under certain circumstances, it may be necessary or advantageous to replenish catalyst deactivated in the course of the polymerization reaction by the addition of boron trifluoride or to increase the catalytic activity of the $BF_3$ complex catalyst by adding boron trifluoride, so that the polymerization does not stop prematurely. This addition of boron trifluoride can be carried out before or after the introduction of the polymerization mixture into the second polymerization stage.

To obtain an isobutene conversion of from 50 to 90%, the residence time of the polymerization mixture in the first polymerization stage is usually from 5 to 60 minutes, but may be shorter or longer depending on whether a very active or less active catalyst is used. In the second polymerization stage, a residence time of from 1 to 180, preferably from 5 to 120, minutes is generally established. In the second polymerization stage, the isobutene conversion established is generally such that the total conversion of the isobutene in the first and second polymerization stages is in general from 80 to 100%, preferably from 90 to 100%, in particular from 95 to 100%. The discharge from the second polymerization stage can be worked up in a conventional manner, for example by deactivating the catalyst by adding further complexing agents, for example water, alcohols, amines or nitriles, extracting the deactivated catalyst from the polyisobutene and isolating the PIB from the PIB-containing phase by removing volatile components, such as solvents, volatile isobutene oligomers and low molecular weight, volatile byproducts, by distillation. The PIB obtained by this procedure has a very high content of terminal double bonds and very low fluorine contents.

If the discharge from the second polymerization stage still contains relatively large amounts of unconverted isobutene, this isobutene can be separated from the polymerization discharge by distillation and then advantageously recycled to the first polymerization stage if pure isobutene was used as a starting material in the polymerization.

Alternatively, the unconverted isobutene can be fed, together with the polymerization discharge from the second polymerization stage, without further working up, to a third polymerization stage and completely polymerized there at a polymerization temperature which is lower than that in the second polymerization stage. In general, the polymerization temperature established in such a third polymerization stage is from 1 to 20° C., preferably from 2 to 10° C., lower than the polymerization temperature in the preceding second polymerization stage. The polymerization temperature can be established using the measures described above for establishing the polymerization temperature in the second polymerization stage. The residence time of the polymerization mixture which is established in the third polymerization stage depends on the catalyst activity and on the desired conversion and is in general from 5 to 180, preferably from 10 to 120, minutes. As stated in the explanation for carrying out the second polymerization stage, it may be necessary or advantageous to replenish spent catalyst by adding boron trifluoride or to increase the catalyst activity by adding boron trifluoride.

Although the use of second and third polymerization stages is advantageous also when pure isobutene is used in the polymerization, it proves to be particularly advantageous when isobutene-containing $C_4$-hydrocarbon streams, such as refined $C_4$ products or $C_4$ cuts from the dehydrogenation of isobutene, are used as starting material in the novel process, since, as a result of said hydrocarbon streams, isobutene losses are avoided, there is no increase in the level of undesirable hydrocarbons due to recycling of unconverted isobutene containing other hydrocarbons into the first polymerization stage and consequently a high-quality, virtually fluorine-free PIB having a high content of terminal double bonds is obtained. The polymerization discharge from the third polymerization stage can be worked up in the same way as that described for working up the discharge from the second polymerization stage.

Residual amounts of isobutene which are still present in the polymerization discharge after the second or, where relevant, after the third polymerization stage and which are less than 2%, preferably up to 1%, of the isobutene originally present in the feed to the first polymerization stage can, if virtually complete isobutene conversion is desired, be completely polymerized in a dwell container which is downstream of the second or third polymerization stage and in this case performs the function of a third or fourth polymerization stage. The dwell container can be operated at the same polymerization temperature as the preceding polymerization stage, but in general a higher temperature is established therein. Thus, the temperature of the polymerization mixture in the dwell container may be from −40 to +40° C., but the temperature therein is preferably increased to 0–40° C., preferably [sic] 0–30° C. The residence time of the polymerization mixture in the dwell container may be from 0.1 to 3, preferably from 0.3 to 2, hours, this residence time of course being controlled according to the polymerization temperature in the dwell container. In general, no more fresh catalyst is added to the polymerization discharge from the preceding polymerization stage, which discharge also enters the dwell container without further working up. Apart from completion of the isobutene polymerization, the passage of the polymerization discharge through the dwell container results in a further reduction in the fluorine content of the polyisobutene formed. Presumably, hydrogen fluoride is eliminated in the dwell container from polyisobutyl fluoride still present in the polymerization discharge of the preceding polymerization stage, with establishment of an equilibrium and with formation of polyisobutene, and some of said hydrogen fluoride is trapped by isobutene still present in the polymerization mixture, with formation of readily volatile isobutyl or tert-butyl fluoride. Unless these readily volatile fluorides have been degraded during working up of the polymerization discharge leaving the dwell container, which may also be effected as described above, they can readily be removed from the PIB by adsorption during the further working up by distillation and can be destroyed. Although the use of a dwell container gives advantageous results, this is an optional measure of the novel process since the cost-efficiency of the use of this dwell container is of course essentially dependent on factors such as the level of the isobutene conversion in the preceding polymerization stages and on the fluorine content of the polyisobutene thus obtained.

DESCRIPTION OF DRAWING

FIG. 1 serves for further illustration of the novel process, in which figure an embodiment of the novel process having four polymerization stages for a simple tube reactor is shown schematically by way of example for the purpose of illustration.

The isobutene or the isobutene-containing hydrocarbon stream, if necessary diluted with an inert solvent, is passed via the feed 1 into the reactor 2 thermostated by means of a cooling bath (not shown). Reactor 2 is in the form of a tube reactor loop in which the polymerization mixture is kept in circulation by means of the pump 3. A high pumping capacity is advantageous for the removal of heat from the reactor and ensures thorough mixing of the polymerization mixture and consequently a constant, steady-state isobutene concentration. The polymerization catalyst may have been mixed with the feed before entry into the polymerization reactor 2 or may be metered in at virtually any point of the reactor 2 through feeds which are not shown. It is possible both to introduce boron trifluoride complex catalyst which has been formed beforehand, ie. outside the polymerization reactor, and to meter the complexing agent used and the boron trifluoride separately into the reactor and to produce the polymerization catalyst in situ in the reactor 2. In the latter case, it should be ensured that there is no temporary high boron trifluoride concentration since this may have an adverse effect on the content of terminal double bonds. In the case of in situ production of the catalyst, the complexing agent is advantageously initially taken and the boron trifluoride metered in only after introduction of the complexing agent. After the desired steady-state equilibrium is established in the reactor 2, the polymerization discharge from reactor 2 is removed via the line 4 and fed to the second polymerization stage, the reactor 5, which is advantageously designed as a tube reactor loop in the same way as reactor 2, in which the polymerization mixture is circulated by means of pump 6. Reactor 5 is cooled by means of a cooling bath which is not shown. In order to increase the catalyst activity, further boron trifluoride can be subsequently metered in via inlets into the feedline 4 or preferably into the reactor loop 5, which inlets are not shown. After the desired steady-state polymerization equilibrium is established in reactor 5, the polymerization mixture from this reactor 5 is discharged via line 7 and fed to the tube reactor 8 which is present in a cooling bath (not shown), may also be designed as a tube-bundle reactor and is preferably operated as a continuous reactor. The residence time in this reactor can be established, for example, by adjusting the length of the reactor tube as a function of its diameter. If required, additional boron trifluoride can be subsequently metered in via inlets into the feed 7 or preferably into the reactor 8, which inlets are not shown. The discharge from reactor 8 is fed via line 9 to the dwell container 10, which as a rule is not cooled and can be designed, for example, as a tank having an overflow or likewise as a tube reactor. If necessary after being let down beforehand, the discharge from the dwell container is fed via line 11 to the working up stage, which is carried out in a conventional manner, preferably by washing with a complexing agent by means of which the catalyst is deactivated and the polymerization is terminated, particularly preferably by washing with water, subsequent phase separation and purification of the resulting PIB by distillation to remove volatile components. The above statements apply in a corresponding manner to the use of tube bundle reactors, which are preferred when the process is carried out on an industrial scale.

Of course, the novel process as shown in the figure can be modified in a variety of ways, for example by carrying out the polymerization only in two or three polymerization stages. For example, the polymerization may be completed in the first two polymerization stages, corresponding to the reactors 2 and 5 in FIG. 1. It is also possible to carry out the polymerization in polymerization stage 1 (reactor 2) to a relatively high isobutene conversion and to effect the polymerization without the use of a reactor corresponding to reactor 5 in FIG. 1, in a reactor corresponding to reactor 8 in FIG. 1 and, if desired, additionally in a dwell container. Such an embodiment also essentially corresponds to the embodiment of the novel process in which the reactors 2 and 5 in FIG. 1 are virtually combined into a single polymerization stage, the reaction in a polymerization reactor corresponding to reactor 2 of FIG. 1 being carried out under virtually identical polymerization conditions only to an isobutene conversion of, for example, from 4 to 10% and the discharge from this first reactor being fed, without further working up, to the second reactor, which corresponds to reactor 5 in FIG. 1, where the polymerization is then continued to a higher conversion before the discharge of this second reactor is fed to a third reactor constituting the second polymerization stage, for example a reactor corresponding to reactor 8 in FIG. 1, where the polymerization is completed or very substantially completed. The choice with regard to which of these embodiments or which further possible embodiments of the novel process are the most advantageous in a specific case is to be made taking into account the isobutene-containing starting material to be converted in the apparatus, the type of boron trifluoride catalyst used, the desired PIB quality and the available cooling apparatuses, etc., and is routine work for a person skilled in the art when designing the apparatus.

If desired, the reaction of the isobutene can also be carried out to a partial conversion at which a high content of terminal double bonds in the polyisobutene is still ensured, after which the polymerization can be terminated by adding relatively large amounts of a complexing agent, eg. water, the discharge containing the highly reactive PIB can be worked up as described above and the hydrocarbon mixture containing unconverted isobutene and separated off during the working up can be further processed in a conventional manner to give low molecular weight polyisobutene having a lower content of terminal double bonds.

The novel process is carried out using, as catalysts, boron trifluoride complexes with complexing agents which influence the polymerization activity of the boron trifluoride so that, on the one hand, the polymerization gives a low molecular weight polyisobutene and, on the other hand, the isomerization activity of the boron trifluoride with respect to the isomerization of terminal double bonds to unreactive or only slightly reactive double bonds present in the interior of the polyisobutene molecule is reduced. Examples of suitable complexing agents are water, $C_1$–$C_{10}$-alcohols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Complexing agents from the class consisting of the $C_1$–$C_{20}$-alcohols, in particular the $C_1$–$C_4$-alcohols, and from the class consisting of the $C_1$–$C_{20}$-dialkyl ethers are preferably used in the novel process, among which in turn dialkyl ethers in which the ether oxygen is bonded to the tertiary carbon atom of a tertiary alkyl group are preferred, in particular ethers as described in WO 93/10063. Among the alcohols, the monohydric, secondary $C_3$–$C_{20}$-alcohols, as described in EP-A 628 575, have, as complexing agents, a particularly advantageous effect on the polymerization activity and isomerization activity of the boron trifluoride catalyst, isopropanol and 2-butanol being particularly noteworthy. Boron trifluoride complex catalysts in which the molar ratio of boron trifluoride to complexing agent is less than 1, in particular from 0.4 to 0.95, particularly preferably from 0.5 to 0.8, are preferably used in the novel process. As stated above, the boron trifluoride complex catalysts may be pre-formed, as described, for example, in EP-A 145 235, before being used or may be produced in situ in the polymerization reactor, as described in EP-A 628 575. Gaseous boron trifluoride is advantageously used as a raw material for the preparation of boron trifluoride complex catalysts, and technical-grade boron trifluoride still containing small amounts of sulfur dioxide (purity: 96.5% by weight), but preferably highly pure boron trifluoride (purity: 99.5% by weight), may be used. Boron trifluoride which is free of silicon tetrafluoride is particularly preferably used for the preparation of the catalyst.

The polymerization of the isobutene can be carried out in the presence or absence of solvents which are inert under the reaction conditions, such as saturated hydrocarbons, for example pentane, hexane or isooctane, or halogenated hydrocarbons, such as methylene chloride or chloroform. When $C_4$ cuts are used as starting material, the hydrocarbons present in the $C_4$ cut in addition to the isobutene virtually act as solvents.

On the industrial scale, the polymerization to give PIB is preferably carried out continuously. Conventional reactors, such as tube reactors, tube-bundle reactors or stirred kettles, may be used for this purpose, the novel process preferably being carried out, in the first two polymerization stages, using loop reactors, ie. tube or tube-bundle reactors with continuous circulation of the reaction material, the ratio of feed to circulation being as a rule from 1:1 to 1:1000, preferably from 1:50 to 1:200, v/v. Of course, the feed rate is equal to the rate of the polymerization discharge after the steady-state equilibrium has been established in the polymerization reactor.

In order to avoid high local and steady-state catalyst concentrations in the polymerization apparatus, which may give rise to double bond shifts, it is advantageous, both during introduction of pre-formed catalyst complexes into the reactor and in the in situ preparation of the boron trifluoride complexes in the reactor, to generate turbulent flow of the reaction material in the reactor for thorough mixing of all reactants, for which purpose the reactor may be provided, for example, with suitable baffles, such as baffle plates, or the tube cross sections may be dimensioned so that a suitable flow velocity is established.

The residence time of the isobutene to be polymerized in the individual polymerization stages may be from 5 seconds to several hours, depending on the relevant polymerization stage, the residence time chosen in the individual polymerization stages preferably being from 1 to 180, particularly preferably from 5 to 120, minutes, depending on the desired conversion of the isobutene in these stages. As stated above, the residence time in the dwell container may be up to several hours. The gross reaction rate is dependent on the amount, especially on the molar ratio, of the catalyst used. Usually, the boron trifluoride/secondary alcohol and/or dialkyl ether catalyst is added in amounts of from 0.05 to 1% by weight, based on the isobutene used or on the isobutene present in the hydrocarbon mixture.

The polymerization is advantageously carried out at below 0° C. Although isobutene can be successfully polymerized to highly reactive polyisobutene even at substantially lower temperatures, the reaction is generally carried out at from 0 to −40° C., in particular from −4 to −30° C., particularly preferably from −10 to −25° C. In contrast, consistently higher temperatures may be used in the dwell container, for example up to 40° C. The polymerization may be carried out under atmospheric pressure, the use of super-atmospheric pressure up to 20 bar as well as the autogenous pressure of the reaction system being advantageous but as a rule unimportant with regard to the result of the polymerization. The polymerization reaction is advantageously carried out under isothermal conditions and with establishment of a constant, steady-stage monomer concentration in the reaction medium, in particular to an isobutene conversion of up to about 90%. The polymerization of the residual amounts of isobutene contained in the polymerization mixture may be carried out with decreasing isobutene concentration.

The steady-state isobutene concentration can in principle be freely chosen, as a rule a monomer concentration of from 0.1 to 50, preferably from 0.2 to 10% by weight, based on the total polymerization mixture, advantageously being established.

Since the polymerization reaction is exothermic, the heat of polymerization is generally removed with the aid of a cooling apparatus, which may be operated, for example, with liquid ammonia as a coolant. Another possibility for removing the heat of polymerization is evaporative cooling on the product side of the reactor. Here, the heat evolved is removed by the evaporation of the isobutene and/or other readily volatile components of the isobutene feedstock or of any readily volatile solvent, such as ethane, propane or butane, with the result that the temperature remains constant. Cooling may be effected by internal or external cooling, depending on the reactor type used. Tube reactors are preferably cooled by means of external cooling, the reaction tubes advantageously being present in a cooling bath, and stirred kettle reactors are preferably thermostated by internal cooling, for example by means of cooling coils or by evaporative cooling, on the product side.

For working up, the reaction discharge is advantageously passed into a medium which deactivates the polymerization catalyst and thus terminates the polymerization. For example, water, alcohols, acetonitrile, ammonia or aqueous solutions of mineral bases, such as alkali metal and alkaline earth metal hydroxide solutions, solutions of carbonates of these metals, etc., may be used for this purpose.

In the further course of the working up, the polyisobutene is separated by distillation into $C_4$ hydrocarbons, solvents, oligomers and polyisobutene, advantageously after a plurality of extractions to remove residual amounts of catalyst, usually by washing with methanol or with water. In the case of washing with water, hydrogen fluoride formed in the course of the polymerization is also removed in addition to the catalyst.

If pure isobutene is used as a starting material, it can be recycled to the polymerization, as can isobutene oligomers and solvents. When isobutene-containing $C_4$ cuts are used, the unconverted isobutene and the other $C_4$-hydrocarbons are generally not recycled and are used for other purposes. Readily volatile fluorine-containing byproducts, such as tert-butyl fluoride, can be removed from the polyisobutene together with the other hydrocarbons and separated off from these hydrocarbons by distillation or extraction.

The novel process permits the economical preparation of highly reactive polyisobutenes both from pure isobutene and, particularly advantageously, from isobutene-containing hydrocarbon streams. Very high terminal double bond contents of more than 80 mol % in the PIB and very good selectivities and very high conversions are achieved. The polyisobutenes thus prepared have average molecular weights $M_n$ of from 500 to 20000, preferably from 500 to 5000, Dalton and a narrow molecular weight distribution D.

EXAMPLES

The average molecular weights ($M_n$) of the polymers prepared according to the examples were determined by gel permeation chromatography (GPC), standardized polyisobutenes being used for calibration. The number average molecular weight $M_n$ was calculated from the resulting chromatograms according to the equation $$M_n = \frac{\sum c_i}{\sum \frac{c_i}{M_i}}$$

where $C_i$ is the concentration of the individual polymer species i in the resulting polymer mixture and $M_i$ is the molecular weight of the individual polymer species i. The molecular weight distribution, referred to below as dispersity D, was calculated from the ratio of the weight average molecular weight ($M_w$) to the number average molecular weight ($M_n$) using the equation $$\frac{M_w}{M_n} = D.$$

The weight average molecular weight $M_w$ was determined from the resulting chromatograms with the aid of the formula $$M_w = \frac{\sum c_i M_i}{\sum c_i}.$$

For the purposes of the present application, vinylidene double bonds or terminal double bonds are understood as meaning those double bonds whose position in the polyisobutene macromolecule is described by the general formula IIa

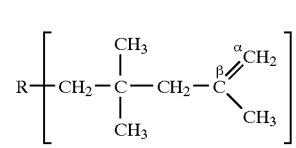

IIa where R is the relevant polyisobutylene radical. The type and amount of the double bonds present in the polyisobutene prepared according to the invention was determined with the aid of the $^{13}$C-NMR spectroscopy method, in which the two carbon atoms marked α and β in the formula IIa and associated with the terminal double bond are identifiable in the $^{13}$C-NMR spectrum by their signals at the chemical shift of 114.4 and 143.6 ppm, respectively, and the proportion of terminal double bonds relative to other types of double bonds is calculated by determining the peak areas of the signals in relation to the total integral of the olefin signals. For the $^{13}$C-NMR spectroscopy, deuterated chloroform was used as a solvent and tetramethylsilane as an internal standard.

The content of organically bound fluorine in the polymerization solution as well as in the polyisobutene was determined by conventional methods of elemental analysis: For this purpose, the organic material was digested by combustion by the Wickbold or Schöniger method, the fluoride liberated was absorbed in water and the fluoride content of the resulting aqueous fluoride solution was determined potentiometrically with the aid of commercial fluoride ion-selective electrodes using a calibration curve. The content of organically bound fluoride in the sample can be easily calculated from the fluoride content of the solution measured in this manner and from the amount of sample used for combustion (literature: F. Ehrenberger: Quantitative Elementaranalyse; VCH Verlagsgesellschaft, Weinheim, page 436 et seq., page 424 et seq., page 617 et seq.).

In addition to pure isobutene, $C_4$ cuts having the composition according to Table 1 were used for the examples below.

TABLE 1

| $C_4$ cut comprising | Isobutane dehydrogenation | Steam cracker (refined product I) |
| --- | --- | --- |
| Isobutane [% by wt.] | 50.3 | 4.1 |
| n-Butane [% by wt.] | 0.5 | 9.3 |
| trans-But-2-ene [% by wt.] | 0.6 | 7.9 |
| But-1-ene [% by wt.] | 0.1 | 28.8 |
| Isobutene [% by wt.] | 48.0 | 45.2 |
| cis-But-2-ene [% by wt.] | 0.3 | 4.5 |
| Butadiene [ppm] | less than 50 | 87 |

Example 1

The reactor (= reactor 2 in the figure) consisted of a Teflon tube which had a length of 7.6 m and an internal diameter of 4 mm and via which 50 l of reactor content were circulated by means of a gear pump. The tube and pump had a capacity of 100 ml. The Teflon tube and pump head were present in a cold bath at –19° C. (cryostat). Refined product I (composition: Table 1) was used as feed, at a rate of 300 g/h. It was dried over a 3 Å molecular sieve to a water content of less than 3 ppm and fed to the circulation reactor through a capillary which had an internal diameter of 2 mm and was precooled to –19° C. The amounts of $BF_3$ and of isopropanol were varied until a molecular weight $M_n$ of 1000 was obtained at an isobutene conversion of 80% PIB. The amount of $BF_3$ was 10 mmol and that of ispropanol was 15 mmol. The reactor temperature was –13° C.

The isobutene conversion was determined by gas chromatographic analysis of the exit gas. The feeds, the reactor volumes and the volume contraction due to polymerization gave an average residence time of about 13 minutes. The polymerization was terminated with 15 ml/h of acetonitrile, immediately after the pressure regulation means in the discharge tube or the sampling port.

The pressure conditions in the reactor are determined by its geometry, the amount circulated, the viscosity of the reaction mixture and the pressure regulation. The pressure regulation means directly at the reactor outlet on the pressure side of the pump was set to 7 bar and, under the prevailing concentration conditions, about 4 bar were measured on the suction side of the pump. The pressure loss of the system was thus 3 bar.

After termination of the polymerization by means of acetonitrile, the reactor discharge was fed with 600 ml/h of hot water (60° C.) into a 1 l stirred flask and residual liquefied gas was evaporated. This liquefied gas contained 14.1% of isobutene in addition to butanes and n-butenes. It was condensed in a dry ice condenser, and azeotropically entrained water froze out on the surface of the condenser. The level of the separation layer in the stirred flask was maintained by means of a siphon, and that of the mixed phase by means of a lateral outflow with a siphon.

About 2 hours were required before the steady-state equilibrium was established, after which a mixed sample was collected over a period of one hour, worked up as described and taken up in equal amounts of hexane, and further water was separated off. The content of organically bound fluorine in the solution was 114 ppm. After removal of the hexane by distillation, residual volatile components, such as water and oligomers, were separated off by distillation at 1 mbar absolute, the temperature increasing to 230° C. The polyisobutene remaining in the bottom of the rotary evaporator was then characterized. The amount of terminal double bonds was 90 mol %. The viscosity, measured in an Ubbelohde viscometer, was 198 mm$^2$/s, the average molecular weight $M_n$ was 1005 Dalton and the molecular weight distribution D was 1.5. The fluorine content was 65 ppm.

The condensed exit gas was dried over a 3 Å molecular sieve and then transferred to a pressure-resistant container, heated to 50° C. and passed via a riser tube under autogenous pressure into the reactor described above, where it was reacted with 2 mmol of $BF_3$ and 1 mmol of isopropanol at an isobutene concentration of the polymerization mixture of 0.6% by weight.

After the working up, a conventional polyisobutene containing 28 mol % of terminal double bonds and having a viscosity (100° C.) of 219 mm$^2$/s, an average molecular weight $M_n$ of 980 Dalton and a dispersity D of 1.8 was obtained.

Further information for carrying out this example is given in Table 2.

Example 2

A polymerization apparatus comprising 2 circulation reactors (= reactors 2 and 5 in the figure), as described in Example 1, was used. In contrast to this description, in this experiment the Teflon tubes were 4.5 m long in the first reactor and 2.7 m long in the second reactor. The feeds of 150 g/h each of hexane and isobutene were dried in the manner described and fed to the reactor system separately by capillaries having an internal diameter of 2 mm. The amounts of $BF_3$ and isopropanol fed in were varied until polyisobutene having an average molecular weight $M_n$ of 1040 Dalton formed at a reactor temperature of –7° C. and at an isobutene conversion of 50%. 15 mmol of $BF_3$ and 27 mmol of isopropanol were required.

The reactor discharge was passed, without further additions and without working up, into the second reactor, which was operated at a reactor temperature of –14° C. Here, the isobutene was further polymerized until the total conversion reached 79%. The discharge from this reactor was then treated as in Example 1 for termination of the polymerization and for working up. The polyisobutene obtained contained 95 mol % of terminal double bonds, its viscosity (100° C.) was 203 mm$^2$/s, the average molecular weight $M_n$ was 1040 Dalton and the dispersity D was 1.5. Further information on this example is contained in Table 2.

Example 3

A polymerization apparatus comprising 2 circulation reactors, as described in Example 1, was used. In contrast to the description in Example 1, in this experiment the Teflon tube in the first reactor was 0.7 m long and that in the second reactor was 6.5 m long. The starting material used was refined product I (composition: Table 1). The feed of refined product I was dried in the manner described. The amounts of $BF_3$ and isopropanol fed in were varied until polyisobutene having an average molecular weight $M_n$ of 1000 Dalton was formed at a reaction temperature of –11° C. in the first reactor and at an isobutene conversion of 6%. The discharge from the first reactor was passed into the second reactor without further working up. In the second reactor, whose temperature had been brought to –13° C., the polymerization was continued until the total conversion of the isobutene contained in the feed was 90%. After termination of the polymerization reaction by the addition of acetonitrile and extraction of the deactivated $BF_3$ catalyst with water, unconverted isobutene was removed by distillation, together with the other hydrocarbons contained in the refined product I. The polyisobutene residue was taken up in the same amount of hexane and distilled again for separation from traces of water. The polyisobutene solution obtained contained 143 ppm of organically bound fluorine after the extraction and 3 ppm after working up by distillation. working up by distillation was carried out in the manner described. The PIB obtained after said working up had an average molecular weight $M_n$ of 960 Dalton and a dispersity of 1.6 and contained 86 mol % of terminal double bonds.

Further information on this example is given in Table 2.

Example 4

150 g each of dried hexane and isobutene were introduced, as described in Example 2, into a reactor according to Example 1. $BF_3$ and isopropanol were fed in the manner described into the precooled hexane stream, and the feed was varied until polyisobutene having an average molecular weight $M_n$ of 1015 Dalton formed at an isobutene conversion of 90%. The reactor temperature was −13° C. and the cooling bath temperature −19° C. After termination of the polymerization, extraction and distillation, a sample of the reactor discharge was analyzed: the content of organically bound fluorine was 98 ppm, which decreased to below 1 ppm after working up by distillation. The content of terminal double bonds was 88 mol % and the dispersity D was 1.5.

The discharge from the first reactor (= reactor 2 according to the figure) was transferred, without working up, to a further reactor (= reactor 8 in the figure)—a 50 cm long Teflon tube having an internal diameter of 4 mm—and was passed through the latter in a single pass. The reactor 8 was present in the same cooling bath as reactor 2 but, owing to the lower isobutene conversion, the reactor temperature decreased to −16° C. In this reactor 8, the residual isobutene was virtually completely converted.

A sample of the discharge from this reactor was analyzed: at a total isobutene conversion of over 99%, the average molecular eight $M_n$ of the polyisobutene obtained was 1015 Dalton, the content of terminal double bonds was 88 mol %, the dispersity was 1.5 and the content of organically bound fluorine before the distillation was 93 ppm and that after the distillation was less than 1 ppm.

The discharge from this reactor 8 was passed, without working up, into a dwell container, where it was kept at +20° C. for an average residence time of 3 hours. In the discharge from the dwell container, the isobutene was virtually completely converted and the polyisobutene obtained was completely identical to the polyisobutene from the preceding reactor with regard to its analytical data, but the content of organically bound fluorine before the distillation was only 5 ppm.

Further information on this example is given in Table 2.

Example 5

Reactor 2 according to Example 1 was fed with a dried $C_4$ cut from the dehydrogenation of isobutane (composition: see Table 1). With 12 mmol of $BF_3$ and 18 mmol of isopropanol, an isobutene conversion of 80% was obtained at a reactor temperature of −13° C. The resulting polyisobutene had an average molecular weight $M_n$ of 1030 Dalton and a dispersity D of 1.5 and contained 92% of terminal double bonds. The content of organically bound fluorine was 124 ppm before the distillation and 15 ppm thereafter. The discharge from reactor 2 was passed, without further working up, straight through a tube reactor 8 comprising a Teflon tube having a length of 1 m and an internal diameter of 4 mm. The reactor temperature was −21° C. After the mixture had passed through this reactor 8, the isobutene conversion had increased to 99%. According to the analytical results, the polyisobutene obtained after working up was completely identical to that of the sample from reactor 2.

Further information on this example is given in Table 2.

TABLE 2

| Example | | 1 | | 2 | | 3 | | 4 | | | 5 | |
|---|---|---|---|---|---|---|---|---|---|---|---|---|
| Reactor combination* | | 2 + 5 | | 2 + 5 | | 2 + 5 | | 2 + 8 + 10 | | | 2 + 8 | |
| Feed | | Refined product I | | Isobutene | | Refined product I | | Isobutene | | | $C_4$ Dehydrogenation | |
| Reactor | | 2 | 5 | 2 | 5 | 2 | 5 | 2 | 8 | 10 | 2 | 8 |
| Embodiment | Tube length [m] | 7.6 | 7.6 | 4.5 | 2.7 | 0.7 | 6.5 | 7.6 | 0.5 | — | 7.6 | 1 |
| | Volume [ml] | 100 | 100 | 61 | 39 | 14 | 87 | 100 | 11 | 1200 | 100 | 17 |
| | Feed, total [g] | 300 | 300 | 300 | 300 | 300 | 300 | 300 | 300 | 300 | 300 | 300 |
| | Circulation/feed | 100 | 100 | 100 | 100 | 100 | 100 | 100 | — | — | 100 | — |
| | Mean residence time [min] | 13.6 | 12.6 | 8.4 | 5.7 | 1.7 | 12.1 | 14.9 | — | 180 | 14.5 | — |
| | Temperature [° C.] | −13 | −15 | −7 | −14 | −11 | −13 | −13 | −16 | +20 | −13 | −21 |
| | Pressure [$bar_{abs}$] | 4–7 | 5–6 | 5–6 | 4–7 | 5 | 4–7 | 4–7 | 1 | 1 | 5–6 | 1 |
| | $BF_3$ [mmol] | 10 | 2 | 15 | | 10 | | 11 | | | 12 | |
| | Isopropanol [mmol] | 15 | 1 | 27 | | 14 | | 17 | | | 18 | |
| | Molar $BF_3$ isopropanol ratio | 0.66 | 2 | 0.55 | | 0.71 | | 0.65 | | | 0.66 | |
| | Isobutene conversion [%] | 80 | 96 | 50 | 58 | 6 | 88.5 | 90 | 90 | — | 80 | 95 |
| | Σ Isobutene conversion [%] | — | 99 | — | 79 | — | 90 | — | 99 | >99 | — | 99 |
| | Fluorine content a. e. [ppm] | 114 | 68 | — | 84 | — | 143 | 98 | 93 | 5 | 124 | 107 |
| | Fluorine content a. d. [ppm] | 65 | 35 | — | <1 | — | 3 | <1 | <1 | <1 | 7 | 7 |
| | Terminal double bonds [mol. %] | 90 | 28 | — | 95 | — | 86 | 88 | 88 | 88 | 92 | 92 |
| | Viscosity$_{100° C.}$ [$mm^2/s$] | 198 | 219 | — | 203 | — | 200 | 210 | 210 | 210 | 217 | 217 |
| | $M_n$ | 1005 | 980 | — | 1040 | — | 960 | 1015 | 1015 | 1015 | 1030 | 1030 |
| | D | 1.5 | 1.8 | — | 1.5 | — | 1.6 | 1.5 | 1.5 | 1.5 | 1.5 | 1.5 |

*Numbering according to FIG. 1
a. e.: after extraction
a. d.: after distillation

We claim:

1. A process for the preparation of low molecular weight, highly reactive polyisobutene having an average molecular weight $M_n$ of from 500 to 20000 Dalton and containing over 80 mol % of terminal double bonds by the polymerization of isobutene or an isobutene-containing hydrocarbon stream in the liquid phase and with the aid of a boron trifluoride complex catalyst at from −40 to 0° C. and at from 1 to 20 bar, which comprises carrying out the polymerization reaction in at least two polymerization stages, the isobutene being polymerized to a partial conversion of from 5 to 98% in the first polymerization stage and the polymerization of the remaining isobutene being continued in one or more subsequent polymerization stages, without or after prior isolation of the polyisobutene formed in the first polymerization stage.

2. A process as claimed in claim 1, wherein the polymerization in the second polymerization stage is carried out at a polymerization temperature which is lower than that in the first polymerization stage.

3. A process as claimed in claim 1, wherein, in the first polymerization stage, the isobutene is polymerized to a conversion of from 50 to 95%, based on the amount of isobutene fed to the first polymerization stage.

4. A process as claimed in claim 1, wherein, in the first polymerization stage, the isobutene is polymerized to a conversion of from 50 to 90%, based on the amount of isobutene fed to the first polymerization stage.

5. A process as claimed in claim 1, wherein the discharge from the first polymerization stage is passed, without further working up, into the second or a subsequent polymerization stage.

6. A process as claimed in claim 1, wherein boron trifluoride is subsequently metered into the second or a subsequent polymerization stage.

7. A process as claimed in claim 1, wherein the polymerization mixture obtained after passage to the second or a further polymerization stage is treated in a dwell container serving as a downstream reactor, at a temperature which is higher than that in the preceding polymerization stages, in order to polymerize residual amounts of isobutene still present in said polymerization mixture.

8. A process as claimed in claim 1, wherein the boron trifluoride complex catalyst used comprises a complex or complexes of boron trifluoride with a $C_1$–$C_{20}$-alcohol, a tertiary alkyl ether or water.

9. A process as claimed in claim 1, wherein the boron trifluoride complex catalyst used is a complex of boron trifluoride with isopropanol or 2-butanol.

* * * * *